US010165018B2

(12) United States Patent
Gupta et al.

(10) Patent No.: US 10,165,018 B2
(45) Date of Patent: *Dec. 25, 2018

(54) SYSTEM AND METHOD FOR MAINTAINING A COLLABORATIVE ENVIRONMENT

(71) Applicant: International Business Machines Corporation, Armonk, NY (US)

(72) Inventors: Animesh Gupta, Pune (IN); Shailendra Moyal, Pune (IN); Ishan Rastogi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,775

(22) Filed: Nov. 21, 2017

(65) Prior Publication Data
US 2018/0097855 A1 Apr. 5, 2018

Related U.S. Application Data

(63) Continuation of application No. 15/268,819, filed on Sep. 19, 2016.

(51) Int. Cl.
H04L 29/06 (2006.01)
H04L 12/18 (2006.01)
(Continued)

(52) U.S. Cl.
CPC ...... H04L 65/1086 (2013.01); H04L 12/1822 (2013.01); H04L 65/403 (2013.01); H04N 7/147 (2013.01); H04N 7/15 (2013.01)

(58) Field of Classification Search
CPC ............... H04L 12/1822; H04L 65/403; H04L 65/1086; H04L 67/22; H04N 7/147; H04N 7/15
See application file for complete search history.

(56) References Cited

U.S. PATENT DOCUMENTS 6,163,692 A * 12/2000 Chakrabarti ............ H04M 3/56
455/416
6,839,865 B2 1/2005 Gould et al.
(Continued)

FOREIGN PATENT DOCUMENTS

EP 1593231 A2 11/2005
EP 1593231 B1 * 4/2016 ......... H04L 12/1827
(Continued)

OTHER PUBLICATIONS

IBM Applications to be Treated as Related, for Examiner's Eyes Only, filed Nov. 21, 2017, pp. 1-2.

Primary Examiner — Patrice L Winder
Assistant Examiner — Abderrahmen Chouat
(74) Attorney, Agent, or Firm — Brian J. Colandreo, Esq.; Jeffrey T. Placker, Esq.; Holland & Knight LLP

(57) ABSTRACT

A method, computer program product, and computer system for identifying a plurality of participants in a multi-user collaboration session connected via at least one common computing device. It may be determined that a first client device in the collaboration session is more active with a second client device in the collaboration session than with a third client device in the collaboration session. A failure may be detected of the at least one common computing device connecting the multi-user collaboration session. The multi-user collaboration session may be converted to a point to point connection between the first client device and the second client device based upon, at least in part, determining that the first client device in the collaboration session is more active with the second client device in the collaboration session than with the third client device in the collaboration session.

7 Claims, 6 Drawing Sheets

(51) Int. Cl.
*H04N 7/14* (2006.01)
*H04N 7/15* (2006.01)

(56) References Cited

U.S. PATENT DOCUMENTS

| | | |
|---|---|---|
| 6,879,565 B2 | 4/2005 | Baxley et al. |
| 2006/0083182 A1 | 4/2006 | Tracey |
| 2006/0172727 A1 | 8/2006 | Lee |
| 2008/0069011 A1 | 3/2008 | Sekaran et al. |
| 2009/0086951 A1 | 4/2009 | Geppert et al. |
| 2013/0033563 A1* | 2/2013 | Fullea Carrera .... H04L 12/1822 348/14.02 |
| 2014/0323110 A1* | 10/2014 | Moon ................... H04W 76/23 455/418 |
| 2016/0308920 A1* | 10/2016 | Brunsch ................ H04L 65/403 |

FOREIGN PATENT DOCUMENTS

| | | |
|---|---|---|
| EP | 1593231 B1 | 6/2016 |
| WO | 2004073241 A2 | 8/2004 |

\* cited by examiner

SYSTEM AND METHOD FOR MAINTAINING A COLLABORATIVE ENVIRONMENT

RELATED APPLICATIONS

The subject application is a continuation application of U.S. patent application Ser. No. 15/268,819, filed on Sep. 19, 2016, the entire contents of which are herein incorporated by reference.

BACKGROUND

Collaboration sessions (e.g., audio and/or video conferences) may enable multiple users to communicate remotely. Sometimes, only a few speakers/presenters may speak and discuss, while other participants may only talk when needed. Generally, should the participants get disconnected from the collaboration session (e.g., due to a server failure), there may be a loss of ongoing conversation, which may be disruptive and hinder productivity.

BRIEF SUMMARY OF DISCLOSURE

In one example implementation, a method, performed by one or more computing devices, may include but is not limited to identifying a plurality of participants in a multi-user collaboration session connected via at least one common computing device. It may be determined that a first client device in the collaboration session is more active with a second client device in the collaboration session than with a third client device in the collaboration session. A failure may be detected of the at least one common computing device connecting the multi-user collaboration session. The multi-user collaboration session may be converted to a point to point connection between the first client device and the second client device based upon, at least in part, determining that the first client device in the collaboration session is more active with the second client device in the collaboration session than with the third client device in the collaboration session.

One or more of the following example features may be included. A status of the at least one common computing device may be sent to at least a portion of the plurality of participants in the multi-user collaboration session. Determining that the first client device in the collaboration session is more active with the second client device in the collaboration session than with the third client device in the collaboration session may be based upon, at least in part, a frequency of conversation between the first, second, and third client device in the collaboration session. The multi-user collaboration session may be converted to a point to point connection between the third client device and a fourth client device in the collaboration session. Availability of the at least one common computing device may be detected, and the point to point connection between the first client device and the second client device, and the point to point connection between the third client device and the fourth client device, may be converted to the multi-user collaboration session. Communication may be recorded between the first client device and the second client device during the point to point connection. At least a portion of the communication may be sent to the third client device.

In another example implementation, a computing system may include one or more processors and one or more memories configured to perform operations that may include but are not limited to identifying a plurality of participants in a multi-user collaboration session connected via at least one common computing device. It may be determined that a first client device in the collaboration session is more active with a second client device in the collaboration session than with a third client device in the collaboration session. A failure may be detected of the at least one common computing device connecting the multi-user collaboration session. The multi-user collaboration session may be converted to a point to point connection between the first client device and the second client device based upon, at least in part, determining that the first client device in the collaboration session is more active with the second client device in the collaboration session than with the third client device in the collaboration session.

One or more of the following example features may be included. A status of the at least one common computing device may be sent to at least a portion of the plurality of participants in the multi-user collaboration session. Determining that the first client device in the collaboration session is more active with the second client device in the collaboration session than with the third client device in the collaboration session may be based upon, at least in part, a frequency of conversation between the first, second, and third client device in the collaboration session. The multi-user collaboration session may be converted to a point to point connection between the third client device and a fourth client device in the collaboration session. Availability of the at least one common computing device may be detected, and the point to point connection between the first client device and the second client device, and the point to point connection between the third client device and the fourth client device, may be converted to the multi-user collaboration session. Communication may be recorded between the first client device and the second client device during the point to point connection. At least a portion of the communication may be sent to the third client device.

In another example implementation, a computer program product may reside on a computer readable storage medium having a plurality of instructions stored thereon which, when executed across one or more processors, may cause at least a portion of the one or more processors to perform operations that may include but are not limited to identifying a plurality of participants in a multi-user collaboration session connected via at least one common computing device. It may be determined that a first client device in the collaboration session is more active with a second client device in the collaboration session than with a third client device in the collaboration session. A failure may be detected of the at least one common computing device connecting the multi-user collaboration session. The multi-user collaboration session may be converted to a point to point connection between the first client device and the second client device based upon, at least in part, determining that the first client device in the collaboration session is more active with the second client device in the collaboration session than with the third client device in the collaboration session.

One or more of the following example features may be included. A status of the at least one common computing device may be sent to at least a portion of the plurality of participants in the multi-user collaboration session. Determining that the first client device in the collaboration session is more active with the second client device in the collaboration session than with the third client device in the collaboration session may be based upon, at least in part, a frequency of conversation between the first, second, and third client device in the collaboration session. The multi-user collaboration session may be converted to a point to point connection between the third client device and a fourth client device in the collaboration session. Availability of the at least one common computing device may be detected, and the point to point connection between the first client device and the second client device, and the point to point connection between the third client device and the fourth client device, may be converted to the multi-user collaboration session. Communication may be recorded between the first client device and the second client device during the point to point connection. At least a portion of the communication may be sent to the third client device.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
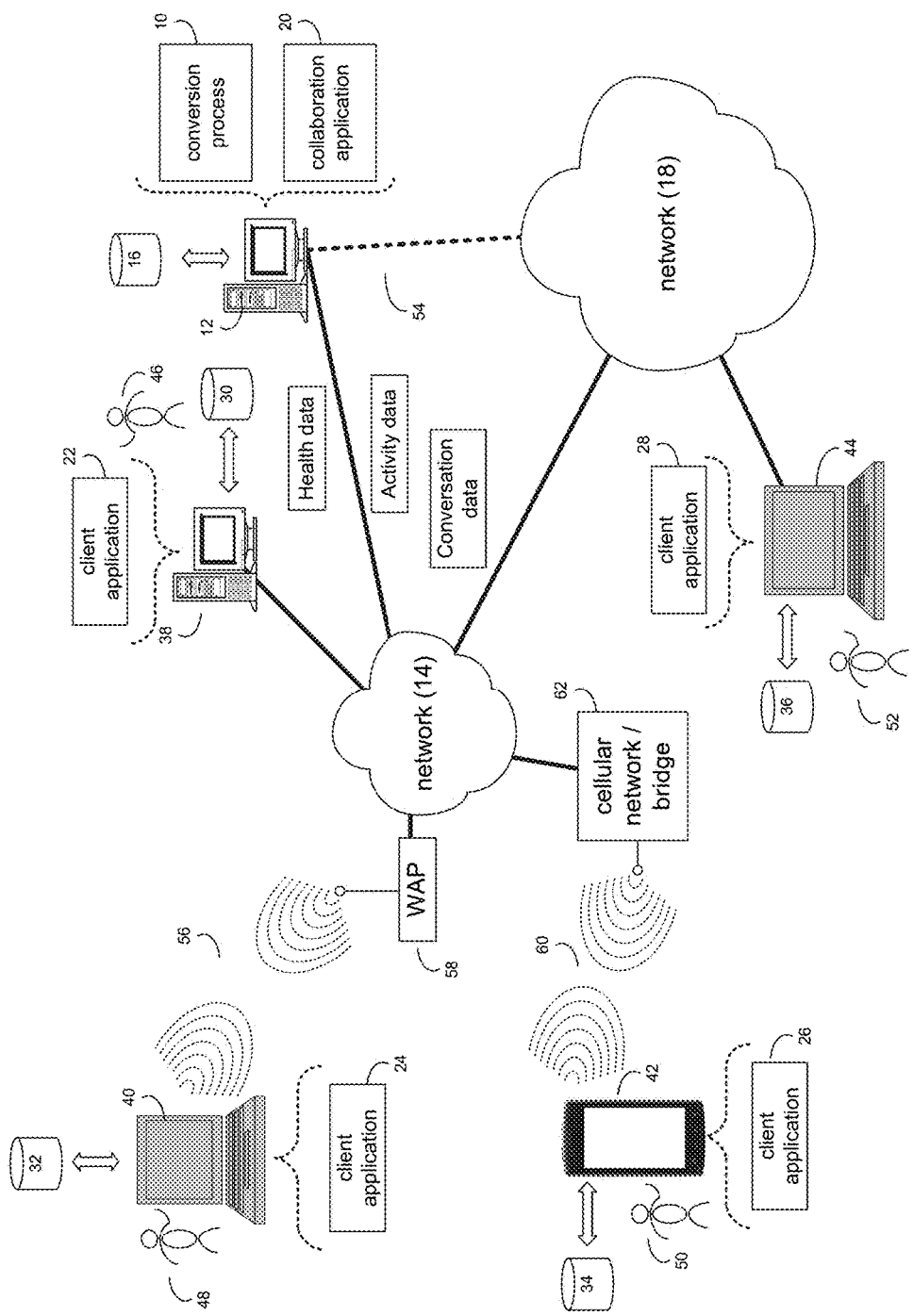
FIG. 1 is an example diagrammatic view of a conversion process coupled to an example distributed computing network according to one or more example implementations of the disclosure.

System Overview:

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown conversion process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a conversion process, such as conversion process 10 of FIG. 1, may identify a plurality of participants in a multi-user collaboration session connected via at least one common computing device. It may be determined that a first client device in the collaboration session is more active with a second client device in the collaboration session than with a third client device in the collaboration session. A failure may be detected of the at least one common computing device connecting the multi-user collaboration session. The multi-user collaboration session may be converted to a point to point connection between the first client device and the second client device based upon, at least in part, determining that the first client device in the collaboration session is more active with the second client device in the collaboration session than with the third client device in the collaboration session.

In some implementations, the instruction sets and subroutines of conversion process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, conversion process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a collaboration application (e.g., collaboration application 20), examples of which may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, a conference manager application, a media control unit application, server health monitoring application, or other application that allows for virtual meeting and/or remote collaboration.

In some implementations, conversion process 10 and/or collaboration application 20 may be accessed via one or more of client applications 22, 24, 26, 28. In some implementations, conversion process 10 may be a standalone application, or may be an applet/application/script/extension that may interact with and/or be executed within collaboration application 20, a component of collaboration application 20, and/or one or more of client applications 22, 24, 26, 28. In some implementations, collaboration application 20 may be a standalone application, or may be an applet/application/script/extension that may interact with and/or be executed within conversion process 10, a component of conversion process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of conversion process 10 and/or collaboration application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, a conference manager application, a media control unit application, server health monitoring application, or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of conversion process 10 (and vice versa). Accordingly, in some implementations, conversion process 10 may be a purely server-side application, a purely client-side application, or a hybrid server-side/client-side application that is cooperatively executed by one or more of client applications 22, 24, 26, 28 and/or conversion process 10.

In some implementations, one or more of client applications 22, 24, 26, 28 may be configured to effectuate some or all of the functionality of collaboration application 20 (and vice versa). Accordingly, in some implementations, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, conversion process 10, and collaboration application 20, taken singly or in any combination, may effectuate some or all of the same functionality, any description of effectuating such functionality via one or more of client applications 22, 24, 26, 28, conversion process 10, collaboration application 20, or combination thereof, and any described interaction(s) between one or more of client applications 22, 24, 26, 28, conversion process 10, collaboration application 20, or combination thereof to effectuate such functionality, should be taken as an example only and not to limit the scope of the disclosure.

In some implementations, one or more of users 46, 48, 50, 52 may access computer 12 and conversion process 10 (e.g., using one or more of client electronic devices 38, 40, 42, 44) directly through network 14 or through secondary network 18. Further, computer 12 may be connected to network 14 through secondary network 18, as illustrated with phantom link line 54. Conversion process 10 may include one or more user interfaces, such as browsers and textual or graphical user interfaces, through which users 46, 48, 50, 52 may access conversion process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
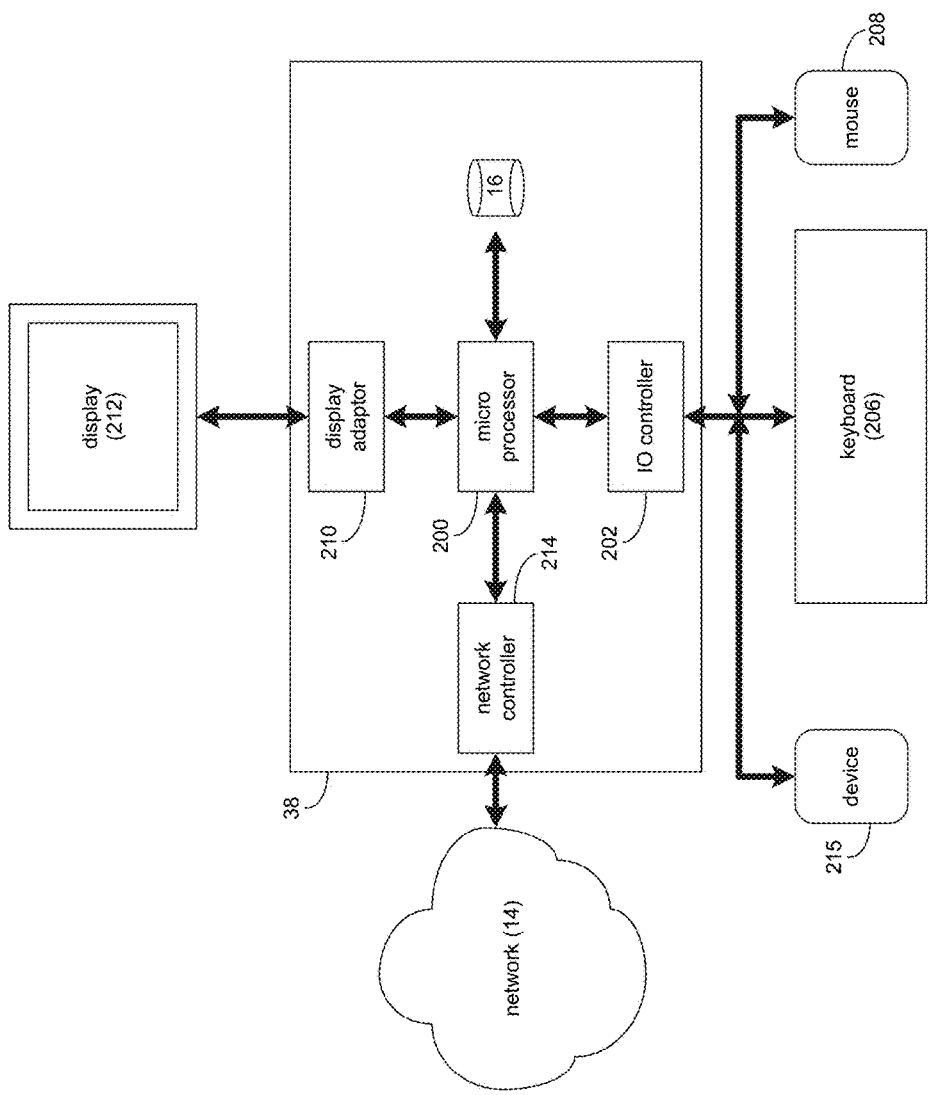
FIG. 2 is an example diagrammatic view of a computer device of FIG. 1 according to one or more example implementations of the disclosure.
Figure 3:
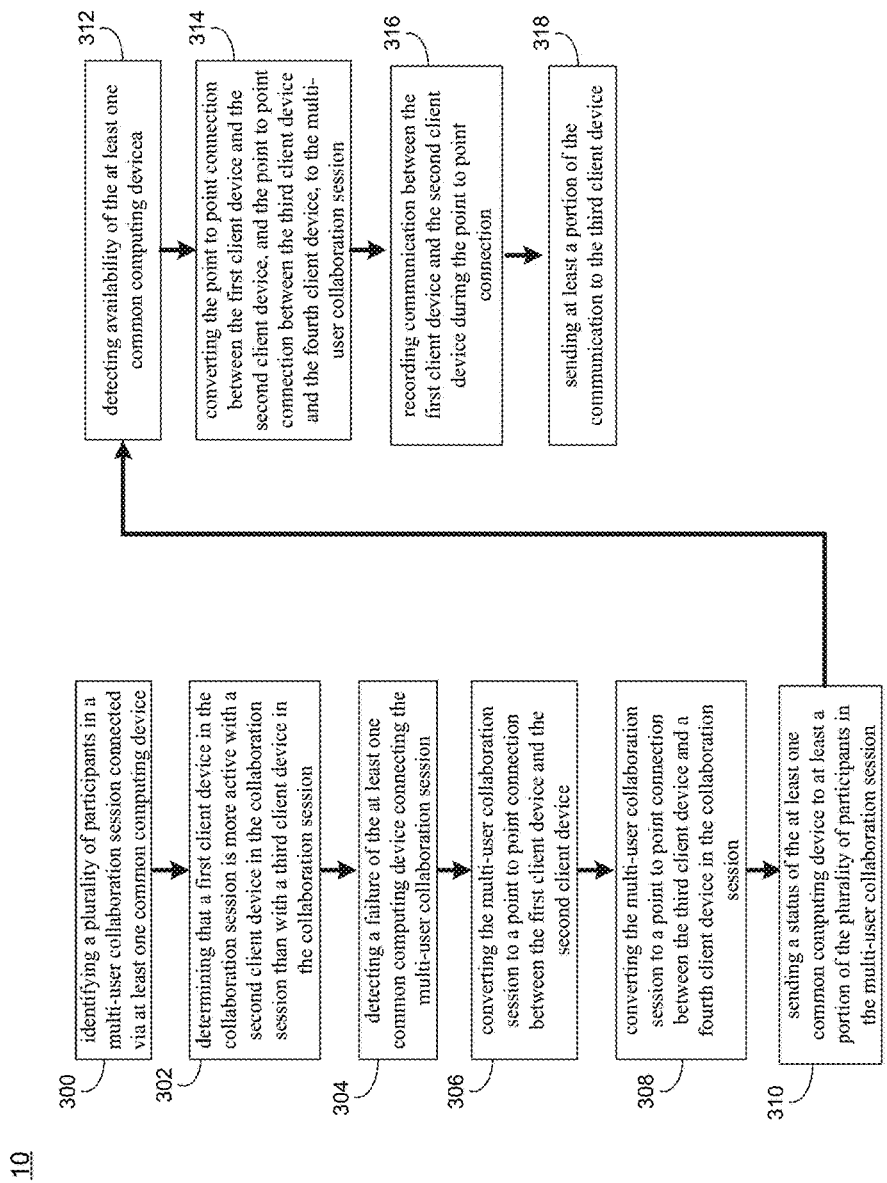
FIG. 3 is an example flowchart of a conversion process according to one or more example implementations of the disclosure.
Figure 4:
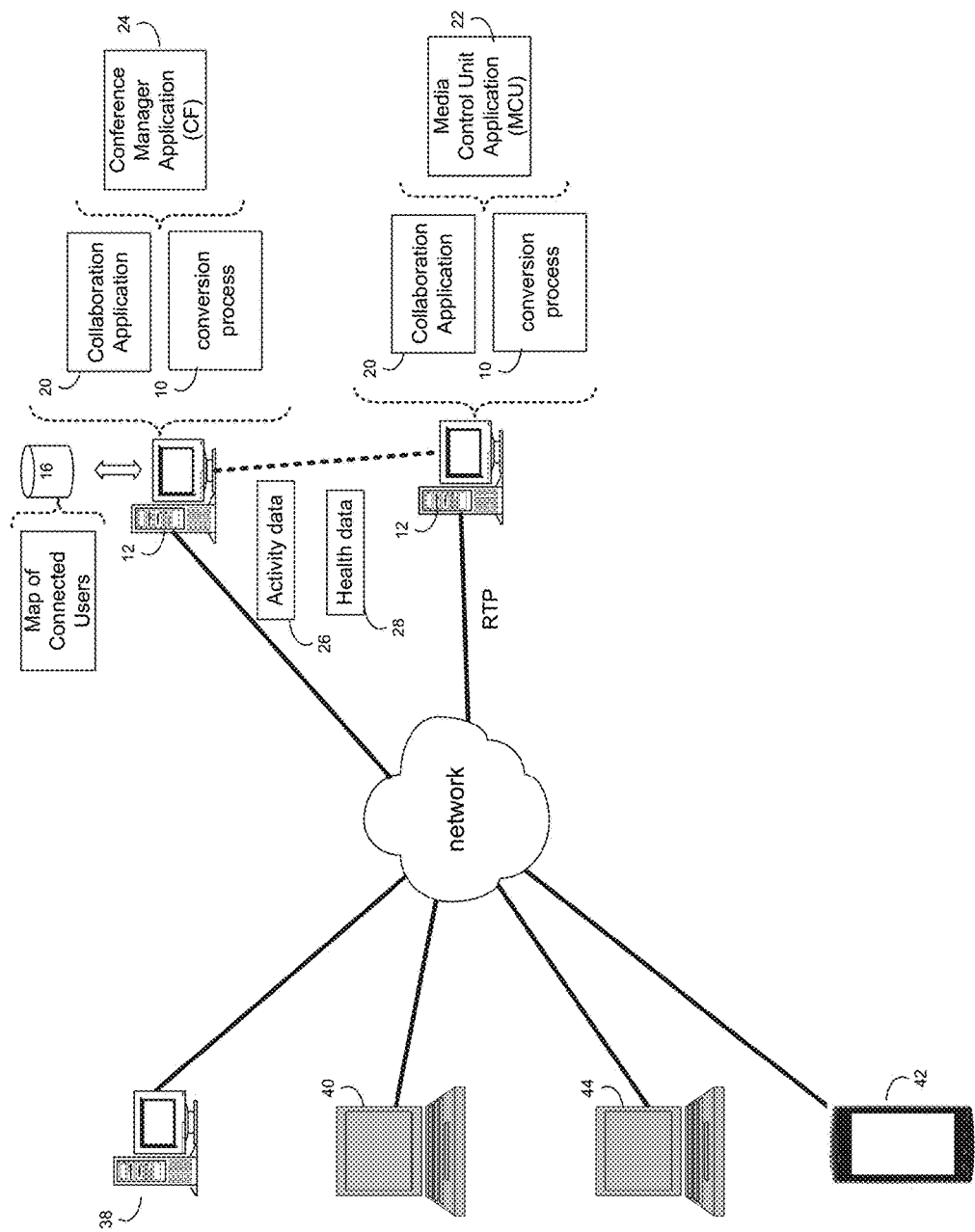
FIG. 4 is an example diagrammatic view of a conversion process coupled to an example distributed computing network according to one or more example implementations of the disclosure.
Figure 5:
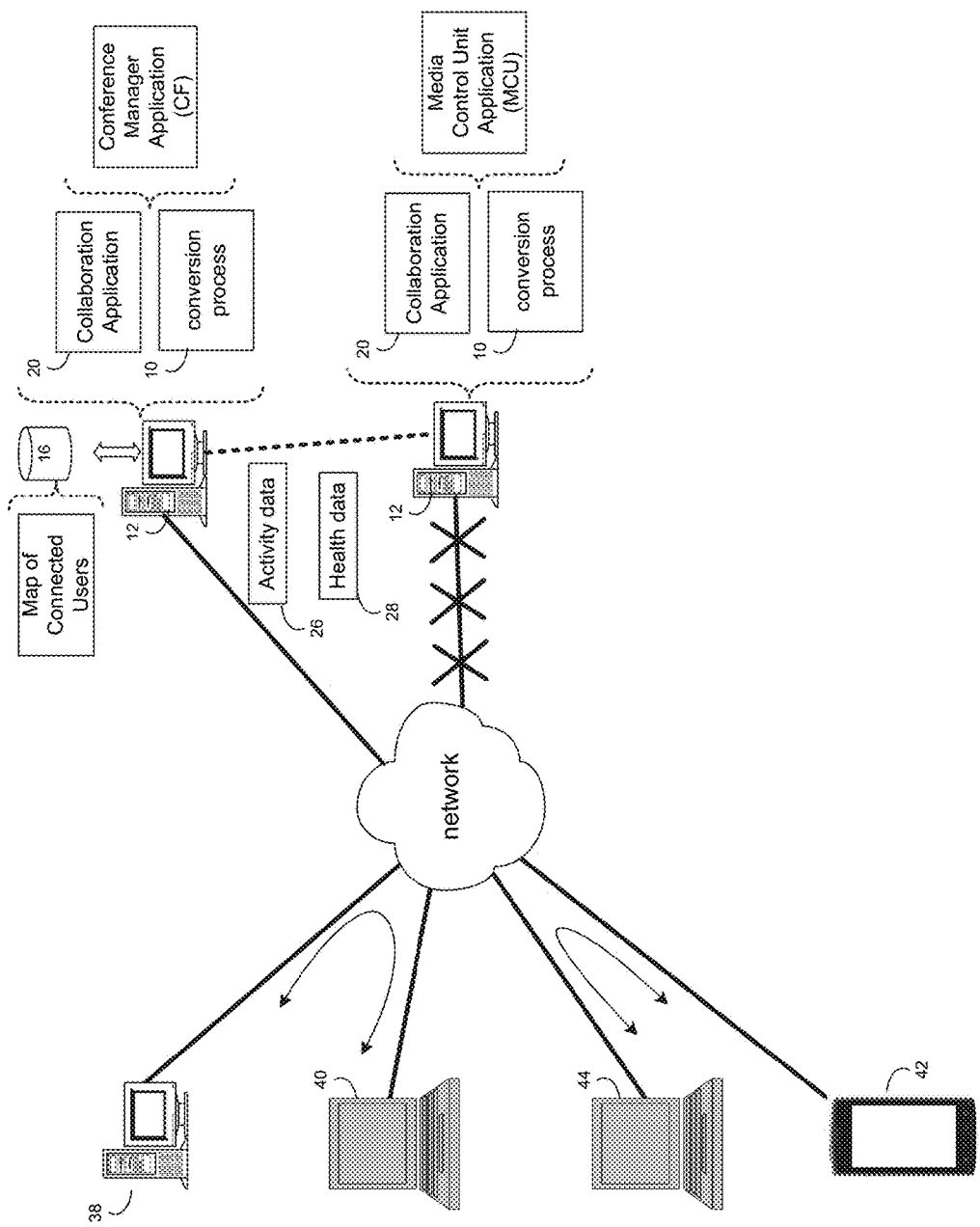
FIG. 5 is an example diagrammatic view of a conversion process coupled to an example distributed computing network according to one or more example implementations of the disclosure.
Figure 6:
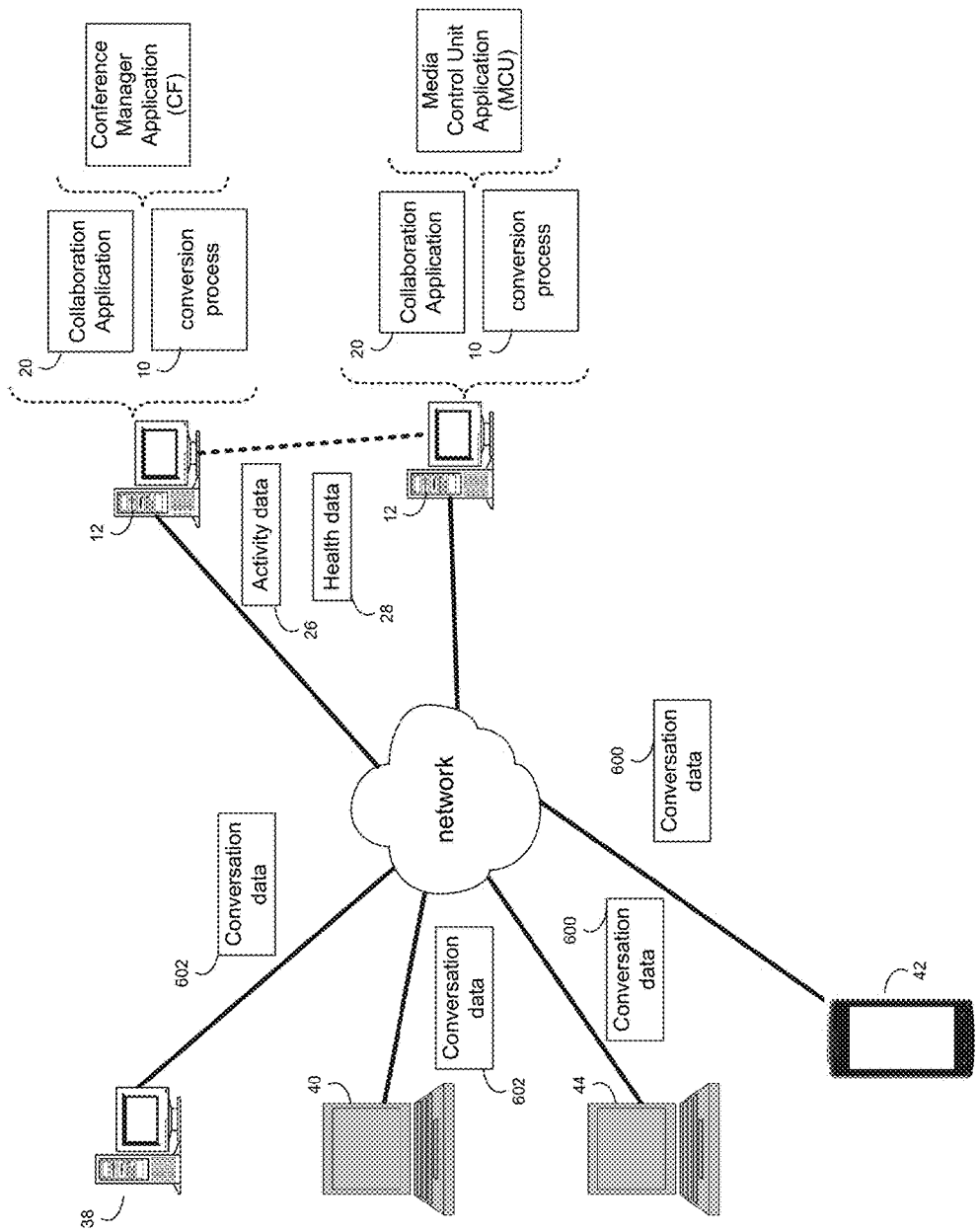
FIG. 6 is an example diagrammatic view of a conversion process coupled to an example distributed computing network according to one or more example implementations of the disclosure.

Referring also to the example implementation of FIG. 2, there is shown a diagrammatic view of computer 12. While computer 12 is shown in this figure, this is for example purposes only and is not intended to be a limitation of this disclosure, as other configurations are possible. Additionally, any computing device capable of executing, in whole or in part, conversion process 10 may be substituted for computer 12 (in whole or in part) within FIG. 2, examples of which may include but are not limited to one or more of client electronic devices 38, 40, 42, 44.

In some implementations, computer 12 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 16). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, collaboration sessions may enable multiple users to communicate remotely. Sometimes, only a few speakers/presenters may speak and discuss, while other participants may only talk when needed. Generally, should each participant get disconnected from the collaboration session (e.g., due to a server failure hosting the collaboration session), there may be a loss of ongoing conversation, which may be disruptive and hinder productivity. A technique to circumvent such a situation may be to use a clustered system, where if one host server fails (e.g., a backend relay server, such as a media control unit (MCU)), a failover operation may take place to re-route the collaboration session through a backup host server. This technique may be expensive, at least because it requires more infrastructure for the backup host server. As will be discussed below, conversion process 10 may enable a failover operation that maintains the conferencing experience using the same infrastructure without a requirement for additional backup host server (although one may still be used if desired).

The Conversion Process:

As discussed above and referring also at least to the example implementations of FIGS. 3-6, conversion process (CP) 10 may identify 300 a plurality of participants in a multi-user collaboration session connected via at least one common computing device. CP 10 may determine 302 that a first client device in the collaboration session is more active with a second client device in the collaboration session than with a third client device in the collaboration session. CP 10 may detect 304 a failure of the at least one common computing device connecting the multi-user collaboration session. The multi-user collaboration session may be converted 306 by CP 10 to a point to point connection between the first client device and the second client device based upon, at least in part, determining 302 that the first client device in the collaboration session is more active with the second client device in the collaboration session than with the third client device in the collaboration session.

In some implementations, CP 10 may identify 300 a plurality of participants in a multi-user collaboration session connected via at least one common computing device. For instance, and referring at least to FIG. 4, assume for example purposes only that a collaboration session (e.g., an audio/video (A/V) conference) is being hosted by CP 10 (e.g., via Conference Manager Server associated with collaboration application 20). In the example, CP 10 (e.g., via Media Control Unit (MCU) application 22) may be executing on a common server used, at least in part, for A/V transfer (e.g., via Real-time Transport Protocol or RTP) to all participants (e.g., client electronic devices 38, 40, 42, and 44). MCU application 22 may be responsible for, at least in part, sending/receiving/mixing audio and/or video packets to end points. Further in the example, CP 10 may identify 300 user 46 (via client electronic device 38), user 48 (via client electronic device 40), user 50 (via client electronic device 42), and user 52 (via client electronic device 44) as participants in the multi-user collaboration session. It will be appreciated that more or less participants may also be identified 300 in the multi-user collaboration session.

In some implementations, CP 10 may determine 302 that a first client device in the collaboration session is more active with a second client device in the collaboration session than with a third client device in the collaboration session. In some implementations, determining 302 that the first client device in the collaboration session is more active with the second client device in the collaboration session than with the third client device in the collaboration session may be based upon, at least in part, a frequency of conversation between the first, second, and third client device in the collaboration session. For instance, CP 10 (e.g., via Conference Manager application 24 associated with collaboration application 20) may create a map of "best connected participants" (e.g., the most active participants). For example, CP 10 may check how many times a particular participant has been involved in conversation with other participants and may weigh it. For instance, assume user 46 (via client electronic device 38) and user 48 (via client electronic device 40) may have, e.g., 50 spoken individual sentences directed towards each other. Further in the example, assume that user 46 (via client electronic device 38) and user 50 (via client electronic device 42) may have, e.g., 10 spoken individual sentences directed towards each other. In the example, CP 10 may determine 302 that user 46 is a better connected (e.g., more active) participant with user 48, rather than user 46, since, in the example, user 46 has spoken more individual sentences directed towards user 48 than user 50. In some implementations, the activity data (e.g., activity data 26) denoting the activity of each participant towards one another may be sent to CP 10 (e.g., via conference manager application 24). In some implementations, CP 10 may store the activity data (and the resulting map of connected users) in, e.g., storage device 16.

In some implementations, CP 10 may repeat the determination 302 for each participant. For instance, assume user 50 (via client electronic device 42) and user 52 (via client electronic device 44) may have, e.g., 30 spoken individual sentences directed towards each other. Further in the example, assume that user 50 (via client electronic device 42) and user 46 (via client electronic device 38) may have, e.g., 5 spoken individual sentences directed towards each other. In the example, CP 10 may determine 302 that user 50 is a better connected (e.g., more active) participant with user 52, rather than user 46, since, in the example, user 50 has spoken more individual sentences directed towards user 52 than user 46.

While one or more implementations involve determining 302 the most active user pairs using sentences directed towards one another, it will be appreciated that other techniques for making such a determination may be used without departing from the scope of the disclosure. For instance, CP 10 may monitor how many times a particular user (e.g., user 46) mentions the name of another user (e.g., user 48) compared to another user (e.g., user 50). In some implementations, CP 10 may repeat the determination 302 for each participant multiple times to determine if the most active pairs have changed and should be updated.

In some implementations, CP 10 may detect 304 a failure of the at least one common computing device connecting the multi-user collaboration session. For instance, and referring at least to FIG. 5, CP 10 may (e.g., via conference manager application 24) receive health information (e.g., health data 28) associated with MCU application 22. Such information may include, e.g., whether the MCU server executing MCU application 22 has experienced a failure. In some implementations, CP 10 may poll for MCU health with conference manager application 24 to obtain the current status of the MCU.

In some implementations, the multi-user collaboration session may be converted 306 by CP 10 to a point to point connection between the first client device and the second client device based upon, at least in part, determining 302 that the first client device in the collaboration session is more active with the second client device in the collaboration session than with the third client device in the collaboration session. In some implementations, CP 10 may convert 308 the multi-user collaboration session to a point to point connection between the third client device and a fourth client device in the collaboration session. For instance, once CP 10 receives (via conference manager application 24) notification for MCU failure, CP 10 may convert 306/308 the multi-user collaboration session into a point to point (P2P) (e.g., using a point to point protocol) call between the most active users. For example, upon the failure notification being received, CP 10 may send (e.g., via conference manager application 24) notification to the client applications running on the client electronic devices of the participants about the MCU failure, and may initiate a point to point call between the most active participants to convert 306/308 the multi-user collaboration session to a point to point connection. In the example, since user 46 and user 48 were determined 302 to be a first most active user pair, a point to point connection may be established between user 46 and user 48 (via their respective client computing devices). As a result, user 46 and user 48 may further the collaboration by continuing their conversation, even though user 50 and 52 are not part of their P2P connection. The cumulative disruption of leaving out user 50 and 52 may be minimized, since the majority of the collaboration session did not involve user 50 and 52 communicating with user 46 or user 48. Further in the example, since user 50 and user 52 were determined 302 to be a second most active user pair, a second point to point connection may be established between user 50 and user 52 (via their respective client computing devices). As a result, user 50 and user 52 may further the collaboration by continuing their conversation, even though user 46 and 48 are not part of their P2P connection. The cumulative disruption of leaving out user 46 and 48 may be minimized, since the majority of the collaboration session did not involve user 46 and 48 communicating with user 50 or user 52. Thus, the conference is not disconnected at this point, but the media transfer becomes the P2P for the most active user pairs.

In some implementations, CP 10 may send 310 a status of the at least one common computing device to at least a portion of the plurality of participants in the multi-user collaboration session. For example, CP 10 may send 310 a status to the participants indicating that, e.g., the MCU server is down, and that the multi-user collaboration session has been converted to a P2P connection with their respective most active user pair. For instance, user 50 may receive a status sent 310 from CP 10 indicating that the MCU server is down, and that the multi-user collaboration session has been converted to a P2P connection to user 52. Similarly, user 52 may receive a status sent 310 from CP 10 indicating that the MCU server is down, and that the multi-user collaboration session has been converted to a P2P connection to user 50. Conversely, user 46 may receive a status sent 310 from CP 10 indicating that the MCU server is down, and that the multi-user collaboration session has been converted to a P2P connection to user 48, and user 48 may receive a status sent 310 from CP 10 indicating that the MCU server is down, and that the multi-user collaboration session has been converted to a P2P connection to user 46.

In some implementations, the status may include a graphical indicator denoting the health of the MCU server. For example, MCU health status may be denoted by, e.g., a circle in colors in a remote video screen of the collaboration session via a user interface associated with CP 10. For example, a red circle may denote that the MCU server is down, but that each most active pair may continue their conversation via the established P2P connection. As another example, a yellow circle may denote that the MCU server is booting up towards up. As yet another example, a green circle may denote that the MCU server is now up (e.g., available), indicating that the multi-user collaboration session may be soon be reestablished between all participants.

In some implementations, CP 10 may detect 312 availability of the at least one common computing device, and the point to point connection between the first client device and the second client device, and the point to point connection between the third client device and the fourth client device, may be converted 314 by CP 10 to the multi-user collaboration session. For instance, as noted above, CP 10 may (e.g., via conference manager application 24) receive health information (e.g., health data 28) associated with MCU application 22. Such information may include, e.g., whether the MCU server executing MCU application 22 has become operational again. In some implementations, CP 10 may poll for MCU health with conference manager application 24 to obtain the current status of the MCU. In some implementations, upon detecting 312 the availability of the MCU server, CP 10 may convert 314 the P2P connection between user 46 and 48 to the multi-user collaboration session, and may convert 314 the P2P connection between user 50 and 52 to the multi-user collaboration session. In some implementations, the conversion 314 may be automatic. In other implementations, CP 10 may send a notification to the users (via their respective client electronic devices) indicating that they may manually rejoin the multi-user collaboration session.

In some implementations, CP 10 may record 316 communication between the first client device and the second client device during the point to point connection. For instance, and continuing with the above example where during MCU failure, a P2P connection is created between user 46 and user 48. In some implementations, the communication (e.g., audio and/or visual) occurring between user 46 and user 48 during the P2P connection may be recorded (e.g., locally and/or remotely). Similarly, in some implementations, the communication (e.g., audio and/or visual) occurring between user 50 and user 52 during the P2P connection may be recorded (e.g., locally and/or remotely).

In some implementations, CP 10 may send 318 at least a portion of the communication to the third client device. For instance, and referring at least to FIG. 6, the recorded communication (e.g., conversation data 600) between user 46 and user 48 during the P2P connection may be sent 318 to user 50 and user 52. Similarly, the recorded communication (e.g., conversation data 602) between user 50 and user 52 during the P2P connection may be sent 318 to user 46 and user 48. Thus, in the example, even though all participants were not involved with each other during the P2P connection, each of the users (via their respective client computing devices) may view/listen to conversation data 600/602 (e.g., audio and/or video files) of the other most active pair to help come up to speed on the missed conversation.

In some implementations, CP 10 may maintain a purging time, where older data may be deleted and the most recent conversation data may be maintained. For example, CP 10 may implement a purging policy whereby conversation data older than, e.g., 5 minutes, an hour, a day, a week, etc. may be deleted.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
identifying, by a computing device, a plurality of participants in a multi-user collaboration session connected via at least one common computing device;
determining that a first client device in the collaboration session is more active with a second client device in the collaboration session than with a third client device in the collaboration session;
detecting a failure of the at least one common computing device connecting the multi-user collaboration session; and
converting the multi-user collaboration session to a point to point connection between the first client device and the second client device based upon, at least in part, determining that the first client device in the collaboration session is more active with the second client device in the collaboration session than with the third client device in the collaboration session.

2. The computer-implemented method of claim 1 further comprising sending a status of the at least one common computing device to at least a portion of the plurality of participants in the multi-user collaboration session.

3. The computer-implemented method of claim 1 wherein determining that the first client device in the collaboration session is more active with the second client device in the collaboration session than with the third client device in the collaboration session is based upon, at least in part, a frequency of conversation between the first, second, and third client device in the collaboration session.

4. The computer-implemented method of claim 1 further comprising converting the multi-user collaboration session to a point to point connection between the third client device and a fourth client device in the collaboration session.

5. The computer-implemented method of claim 4 further comprising:
detecting availability of the at least one common computing device; and
converting the point to point connection between the first client device and the second client device, and the point to point connection between the third client device and the fourth client device, to the multi-user collaboration session.

6. The computer-implemented method of claim 1 further comprising recording communication between the first client device and the second client device during the point to point connection.

7. The computer-implemented method of claim 6 further comprising sending at least a portion of the communication to the third client device.

* * * * *